Fig. 3-a.

INVENTORS
Frederick W. Wilkening
Helmuth G. Broedel
Carl F. Engelhardt
BY
Attorney

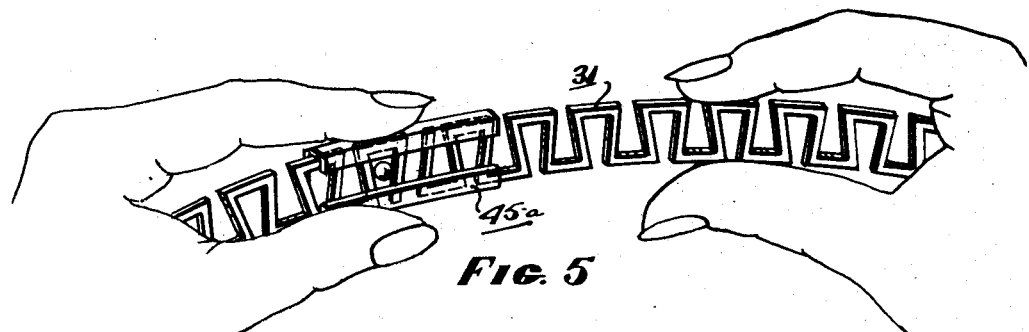
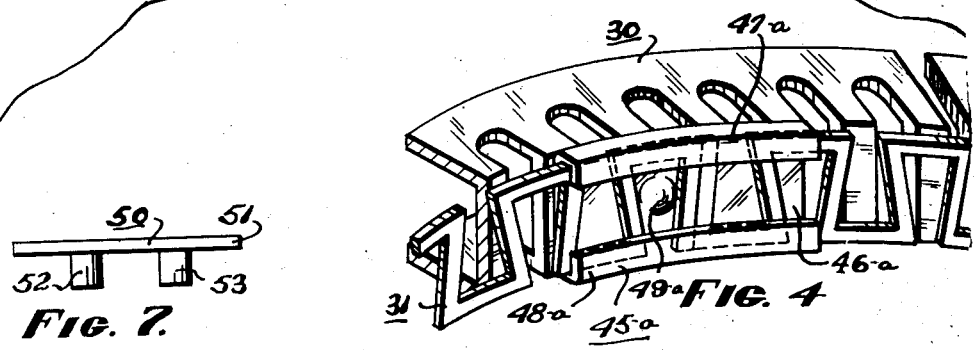
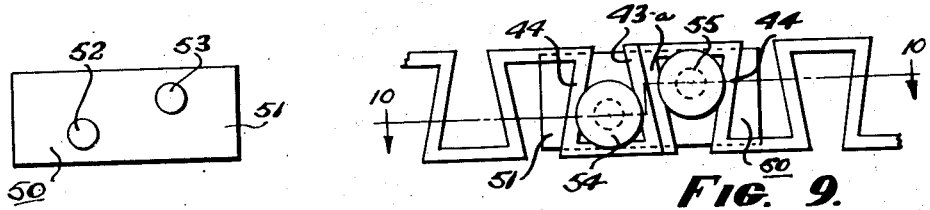
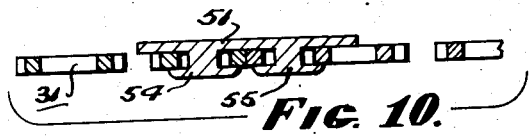
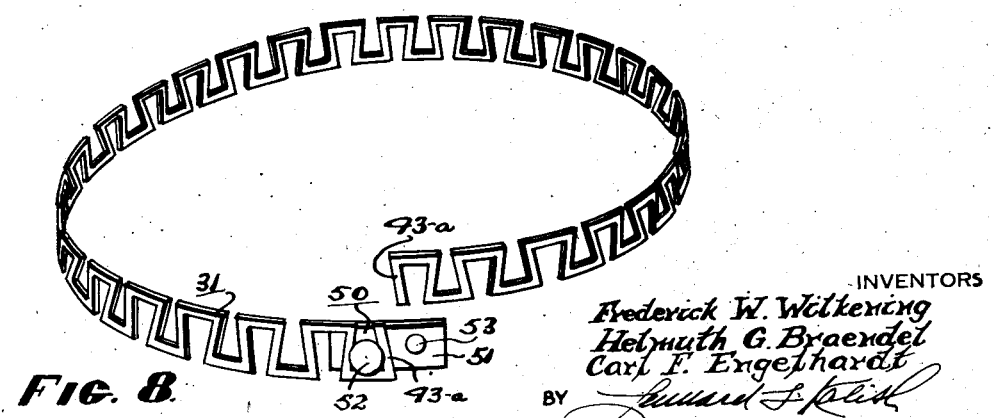

May 19, 1953  F. W. WILKENING ET AL  2,639,205
EXPANDER FOR PISTON RINGS OR THE LIKE
Filed June 3, 1948  3 Sheets-Sheet 3
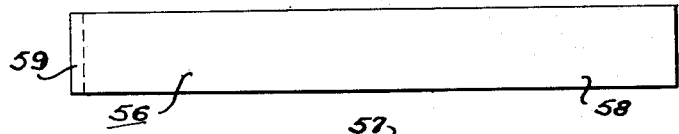
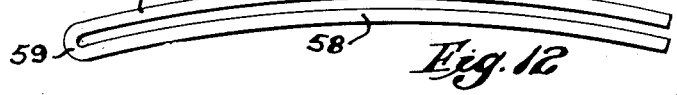
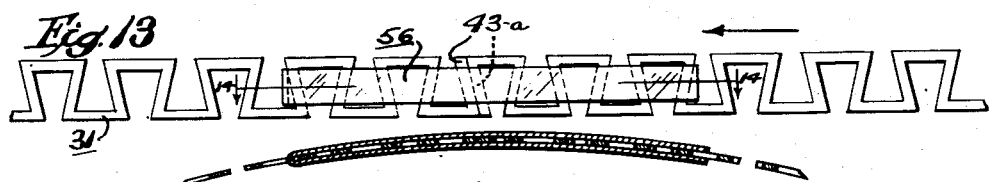
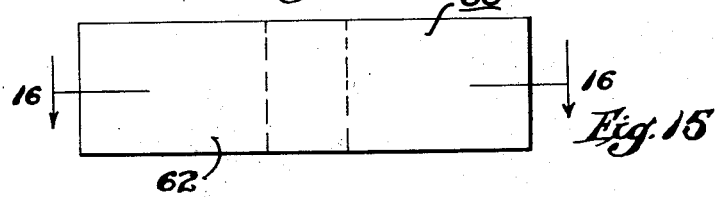
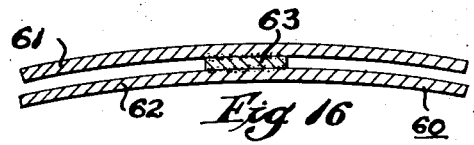
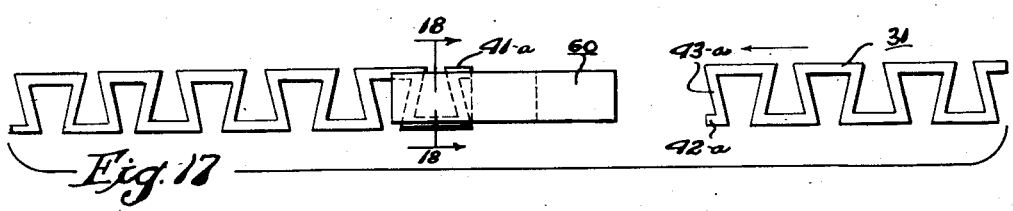
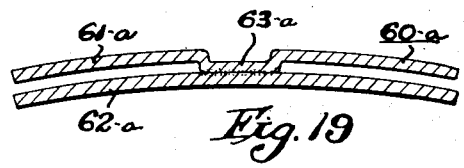
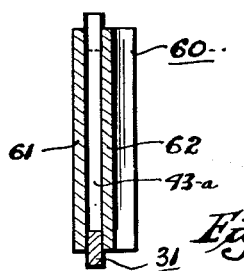
INVENTORS
Frederick W. Wilkening
Helmuth G. Braendel
Carl F. Engelhardt
BY Leonard L. Kalish
Attorney Patented May 19, 1953

2,639,205

UNITED STATES PATENT OFFICE 2,639,205

EXPANDER FOR PISTON RINGS OR THE LIKE

Frederick W. Wilkening, Penn Valley, Helmuth G. Braendel, Paoli, and Carl F. Engelhardt, Yeadon, Pa., assignors to Wilkening Manufacturing Company, Philadelphia, Pa., a corporation of Delaware Application June 3, 1948, Serial No. 30,937

18 Claims. (Cl. 309—45)

The present invention relates to piston-rings for use in internal-combustion engines, diesel engines, compressors, pumps or the like and it relates more particularly to expander-springs for such piston-rings.

An object of the present invention is to provide a new and improved construction for piston-ring expanders. Another object of the present invention is to provide a free-floating non-bottoming expander for piston-rings or the like which can be simply and inexpensively manufactured and which can be installed within a piston-groove quickly and easily and which provides effective, more or less uniform, radially-outward tension for a non-resilient piston-ring. A further object of the present invention is to provide a new and improved connector member for use with piston-ring expanders of the thin flat axially-corrugated metallic-ribbon type, which will permit the quick and easy connection of the free ends of the expander into a generally continuous annulus imparting more or less uniform radially-outward tension to the piston-ring.

Other objects and advantages of the present invention are apparent in the following detailed description, appended claims and accompanying drawings.

It has been suggested in the past to provide expander-springs for piston-rings or the like consisting of a continuously axially-corrugated annulus formed of a strip of relatively thin spring material having its ends held in abutting relationship so as to provide a free-floating ring which does not "bottom" (that is, contact the inner or back wall of the piston-groove) and which will provide substantially uniform radially-outward pressure when installed behind a non-resilient piston-ring, in a piston-groove and within a cylinder. See Patent 2,293,450, issued August 18, 1942.

While the structure of Patent 2,293,450 has proven extremely effective during operation, especially in conjunction with oil-control piston-rings, it has been rather difficult to install on a piston due to the problem of securing the free ends of the spring. Where the free ends have been fastened in advance, as for example by butt-welding or by using a crimped sleeve, it is frequently difficult to slip the closed annulus over the piston-head to get it into the groove without permanently distorting or stretching it beyond its elastic limit.

Where, on the other hand, the ends have been left free with the purpose of connecting them after the expander has been placed in the groove, it is a difficult and trying operation for a mechanic, whose hands are slippery with grease or the like, to capture the elusive free ends of the expander-spring and to hold them in juxtaposition while a welding or crimping or other operation is performed.

According to the present invention, there has been developed a new and improved expander-spring construction which permits the use of thin flat spring metal to provide a free-floating non-bottoming piston-ring support, whose ends can be connected, after the spring has been placed in the piston-groove, quickly and easily and with a minimum of time and effort.

Generally speaking, the present invention contemplates an expander-spring of more or less continuously axially-corrugated relatively thin spring material, one of whose free ends is more or less permanently secured (prior to installation on the piston) to a connector-clip or saddle or the like which is also provided with means permitting the other free end of the expander-spring to be connected thereto quickly and easily and which will hold the free ends of the expander-spring firmly and positively in adjacent relationship so as to maintain the expander-spring in the form of a more or less continuous closed annulus.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 3:
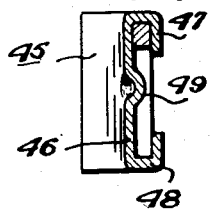
Figure 3 represents a perspective view of the expander of Figures 1 and 2 as it appears during assembly; the fastening clip being shown installed on one end of the expander in position to receive the other end.
Figure 3:
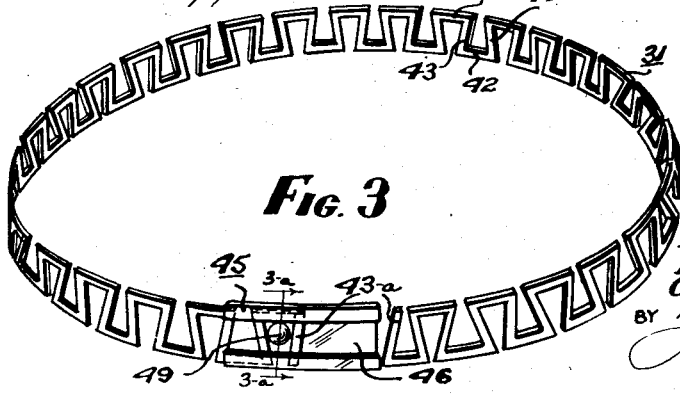

Figure 3-a represents a cross-sectional view generally along the line 3-a—3-a of Figure 3.

Figure 1:
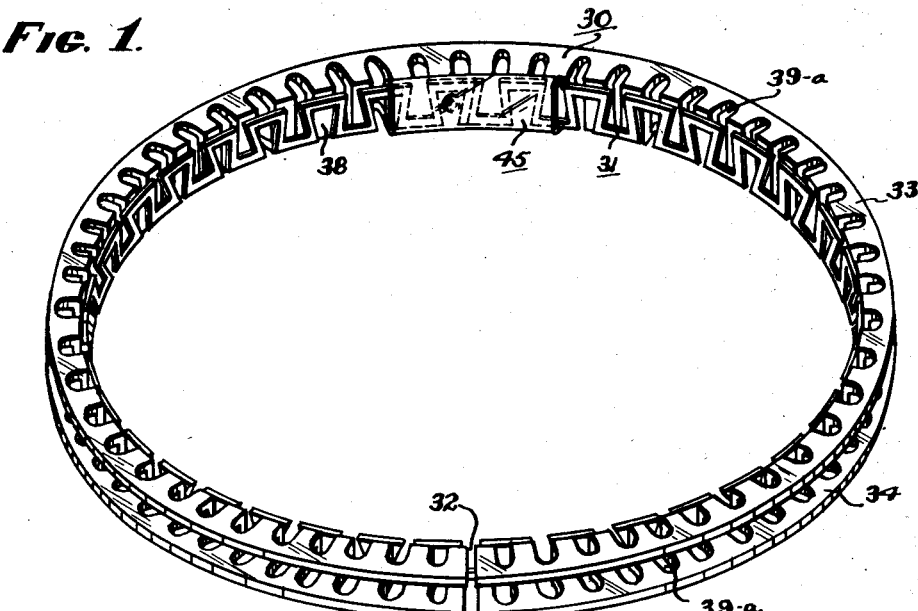
Figure 1 represents a perspective view of one embodiment of the present invention shown in assembled position.
Figure 2:
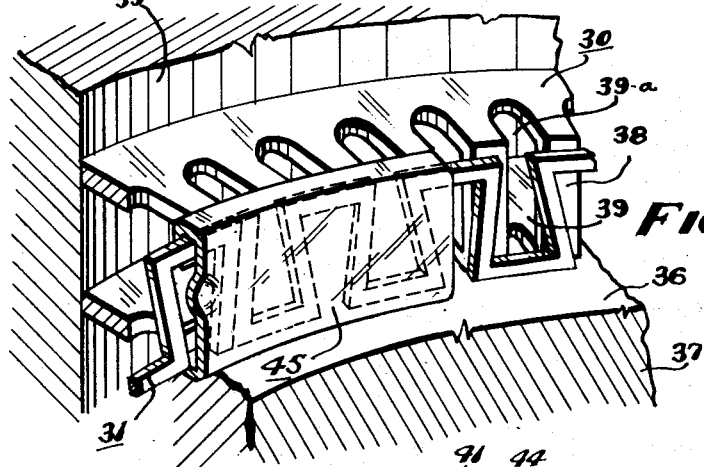
Figure 2 represents a fragmentary perspective view, on an enlarged scale, showing the embodiment of Figure 1 as it appears when installed on the piston and within a cylinder; parts being broken away better to reveal the construction thereof.

Figure 4 represents a fragmentary perspective view showing a modified connector clip construction wherein the flanges are directed radially inwardly (rather than outwardly as in the embodiment of Figures 1-3).

Figure 5 represents a perspective view showing the manner of assembling the expander relative to the connector clip of Figure 4.

Figure 6 represents a front elevational view of another form of connector clip.

Figure 7 represents a top plan view of the embodiment of Figure 6.

Figure 8 represents a perspective view generally like that of Figure 3 but showing the connector clip of Figures 6 and 7; the clip and expander being shown in partially-assembled position.

Figure 9 represents a fragmentary front elevational view showing the connector clip of Figures 6 and 7 fully installed on the expander.

Figure 10 represents a cross-sectional view generally along the line 10—10 of Figure 9.

Figure 11 represents a front elevational view of still another form of connector clip or saddle.

Figure 12 represents a plan view of the embodiment of Figure 11.

Figure 13 represents an inside elevational view, on a scale reduced from that of Figures 11 and 12, showing the saddle or clip of Figures 11 and 12 installed on an expander.

Figure 14 represents a cross-sectional view generally along the line 14—14 of Figure 13.

Figure 15 represents an elevational view of still another form of connector clip or saddle.

Figure 16 represents a cross-sectional view generally along the line 16—16 of Figure 15.

Figure 17 represents an inside elevational view showing the saddle or clip of Figures 15 and 16 in position upon one end of the expander but preliminary to insertion of the other end.

Figure 18 represents a cross-sectional view generally along the line 18—18 of Figure 17.

Figure 19 represents a cross-sectional view generally like that of Figure 16 but showing a somewhat modified form of saddle or clip.

In one embodiment of the present invention shown generally in Figure 1, we may provide a composite two-piece oil-control piston-ring made up of a ring 30 of flexible but non-resilient sheet-metal or the like, and an expander-spring 31 of resilient metal or the like.

The ring 30 is an integrally-formed trans-split annulus having a gap 32 and consists of top and bottom radially-extending axially-spaced flanges or lands 33 and 34 respectively, whose outer peripheral edges serve to contact the cylinder wall 35 when the piston-ring is installed within the groove 36 of a piston 37.

The ring 30 also includes a back or inner wall 38 extending axially intermediate the top and bottom walls or flanges 33 and 34.

A plurality of circumferentially-distributed oil-drain openings or slots 39 are provided in the ring 30; the openings 39 extending axially along the back wall 38 and also having radially-extending portions 39–a extending outward for approximately two-thirds of the radial dimension of the flanges 33 and 34 as shown particularly in Figures 1 and 2.

The ring 30 may be formed from an elongated strip of thin flat-sheet-metal (as for example sheet-steel), which is flexible but not resilient.

As shown more particularly in our co-pending application Serial No. 30,938, filed June 3, 1948, the ring 30 may be formed from a thin flat unperforated strip or "blank" in which the slots 39 are first punched, after which the "blank" is formed into its U-shaped cross-sectional configuration by using any appropriate bending rolls, after which the folded strip is helically coiled and subjected to suitable heat-treating operations, followed by an axial splitting operation to provide a number of trans-split annuli which may then be subjected to appropriate grinding operations and further heat-treatments (if desired).

The expander-spring 31 is an integrally-formed axially-corrugated strip of resilient metal or the like which may be formed by bending a length of wire as shown in Patent 2,293,450 or by stamping the corrugations from a sheet-metal "blank" as shown in our co-pending application Serial No. 30,938, June 3, 1948, filed simultaneously herewith, and as more fully disclosed in Frederick W. Wilkening's co-pending application Serial No. 667,181, filed May 3, 1946, now Patent No. 2,564,744, August 21, 1951, or it may be formed in other ways which will be apparent to those skilled in the art.

The expander-spring 31 may be angularly-corrugated as shown particularly in Figure 3 so as to provide top and bottom longitudinally-extending portions or legs 41 and 42 and intervening portions or legs 43 and 44 which extend generally axially or transversely of the expander strip but are oppositely inclined relative to each other so as to give a more or less triangular configuration; the legs 41, 43, 42 and 44 (in that order) forming acute angles at their junctures.

However, the present invention is not limited to this particular configuration for the axially-corrugated expander and it is contemplated that various other types of corrugations (as, for example, those shown in Patent 2,293,450 or in our co-pending application Serial No. 30,938, June 3, 1948), may be used instead.

After the punching (or wire-bending) operation referred to hereinabove, the elongated strip of corrugated resilient material is formed into individual trans-split strips having appropriate curvature (corresponding generally to the size of the piston-ring).

In the embodiment of Figures 1-3, the individual expander strips are formed so as to leave the free ends of the strip with end-most transverse legs 43–a.

It is necessary, in assembling the piston-ring expander, to tie the free ends of the expander together to prevent them from being displaced from their generally abutting relationship as indicated in Figure 2.

In the embodiment of Figures 1-3, this is effected by providing a saddle or clip 45 which, as shown particularly in Figures 3 and 3–a, is an integral strip of sheet-metal or the like having a longitudinal curvature corresponding generally to that of the piston-ring and including an inner wall 46 and upper and lower flanges 47 and 48 which extend radially outwardly and axially inwardly to give the strip a generally C-shaped cross-section; the axial dimension of the saddle 45 being generally the same as that of the piston-ring and being sufficient to receive the expander ends within the flanges 47 and 48 by end-wise movement thereof.

As indicated particularly in Figure 3, one of the ends of the expander is first positioned within the C-shaped channel of the saddle 45 so that it occupies somewhat slightly less than one-half of the longitudinal dimension of the saddle. A slight button or projection 49 may then be formed on the wall 46 so as to protrude within the C-shaped channel and to prevent withdrawal of the first-inserted end of the expander. This preliminary operation can be done beforehand so that the mechanic can be supplied with the expander in the form shown in Figure 3.

When installing the piston-ring within the piston-groove 36, the expander is first positioned within the piston-groove 36 after which the remaining free end of the expander is inserted into the saddle through the other open end thereof until the free axial or transverse legs 43-a are in abutment as shown particularly in Figure 2. With the expander thus formed into a more or less continuous annulus, the piston-ring is then placed in position around the expander spring (being spread apart somewhat to pass over the piston).

The piston, with its assembled piston-rings may then be installed within the cylinder 35, in conventional manner.

It is apparent that the flanges 47 and 48 prevent axial or radial displacement of the abutting free ends of the expander. With the piston-ring and expander installed within the piston-groove, there is no tendency for the unlocked free end of the expander to move longitudinally or circumferentially so as to slip out of the saddle. It is apparent that this novel saddle or clip construction permits quick and easy installation of the expander-spring and the piston-ring.

The ring and expander are so dimensioned relative to the cylinder that the cylinder wall 35 confines the ring 30 in more or less the position shown in Figure 1 wherein the expander-spring (which acts as a continuous resilient annulus due to the abutting of its free ends within the saddle or clip) exerts a more or less uniform radially-outward pressure around the periphery of the flexible but non-resilient ring 30; thereby insuring a generally uniform pressure pattern of the ring-lands 33 and 34 against the cylinder wall 35.

At the same time, the flexibility of the ring 30 permits it to adapt itself to slight irregularities or "out-of-roundness" in the cylinder wall (such as are occasioned by uneven wear) so as to minimize "blow-by" or loss of compression; and also to minimize oil-consumption.

Moreover, the expander-spring 31, when assembled and installed, is a "free-floating" non-bottoming annulus which depends upon inherent tension and which does not require support from the inner or back wall of the cylinder-groove. Accordingly, there is no need for accurately dimensioning the radial depth of the ring or expander relative to the cylinder-groove in order to assure proper ring-pressure.

In Figures 4 and 5, there is shown a modified saddle or clip construction 45-a which is generally the same as the saddle 45 of Figure 3 except that its continuous wall 46-a is radially outermost instead of innermost and its upper and lower flanges 47-a and 48-a extend radially inwardly instead of outwardly, as does the button 49-a. The curvature of the saddle 45-a is, of course, opposite to that of the saddle 45. In other words, the flanges 47-a and 48-a extend on the concave side of the saddle 45-a (instead of on the convex side as in the case of the saddle 45).

The manner of assembly and installation is exactly the same as that described hereinabove except that the saddle 45-a is so positioned that its wall 46 is on the outer side of the expander (in juxtaposition to the back wall of the piston-ring), in the manner indicated in Figure 5 when the free end of the expander strip is fitted into the clip.

In Figures 6-10 there is shown another embodiment of the present invention employing a different form of saddle 50 which includes a thin flat plate 51 from which protrude two buttons 52 and 53 which are originally generally cylindrical, with a diameter such that they can be fitted within the end-most triangular openings formed by the free legs 43-a and 44, the next adjacent legs of the expander-strip, and so that their protruding portions can be flattened to provide enlarged heads 54 and 55, in the manner shown particularly in Figures 9 and 10, so as to lock the free ends of the expander-spring in abutting relationship.

The plate 51 is preferably slightly smaller in transverse or axial dimension than the expander-spring so that it does not contact the walls of the piston-groove.

The buttons 52 and 53 are preferably spaced apart both circumferentially and axially so that they coincide with the largest ends of the oppositely-directed triangular openings at the ends of the expander-spring.

As indicated particularly in Figure 8, it is possible to pre-lock the button 52 to one of the ends of the expander-strip so that the mechanic installing the ring assembly need only attach the other free end of the expander-strip to the button 53 to form a closed annulus within the piston-groove, with the free axial legs 43-a in abutting relationship as indicated in Figure 9.

By employing any suitable clamping tool, the mechanic can then form the holding head 55 on the button 53 in the manner indicated in Figure 10 to provide a positive interlock.

However, the formation of one or both of the heads 54 and 55 may be dispensed with since the inherent tension of the expander-spring against the piston-ring will tend to maintain its ends firmly attached to the saddle or clip 50 without the need for the additional lock provided by the enlarged heads.

While, in Figure 8, the plate 51 is shown as disposed on the inner side of the expander-spring (with the buttons protruding radially outwardly), it is possible to position the plate on the outer side (in juxtaposition to the piston-ring) with the buttons protruding radially inwardly, in a manner analogous to the flanges 47-a and 48-a of Figure 4.

While the plate 51 has a relatively short circumferential dimension so that it does not require a curvature as in the case of the embodiments of Figures 3 and 4, it is possible nevertheless to provide the plate 51 with a slight curvature; the buttons 52 and 53 being either on the convex side (where the saddle is positioned in the manner shown in Figure 8) or on the concave side (where the plate 51 is positioned outermost with the buttons protruding inwardly).

In Figures 11-14 there is shown still another form of saddle or clip 56 which takes the form of an elongated U-shaped member which is constructed and arranged to extend in a generally circumferential direction relative to the expander-spring. The saddle 56 is made up of outer and inner walls 57 and 58 (which are slightly smaller, in transverse dimension, than the expander-spring and which have a curvature corresponding generally to that of the piston-ring) and a generally radial connecting wall 59 formed integrally with the walls 57 and 58, at one end thereof.

The manner of assembly and installation of the expander-spring with the saddle or clip 56 is obvious. Thus, the saddle or clip 56 is first fitted axially over one end of the expander strip so that the wall 59 enters one of the triangular slots and is thereafter held against appreciable circumferential movement, with the free ends of the walls 57 and 58 extending substantially beyond the free leg 43–a of that end of the expander strip.

The other end of the expander strip is then connected to the saddle or clip 56 by forcing it into the saddle or clip through the protruding open end thereof in the manner indicated by the arrow in Figure 13; the movement continuing until the other free leg 43–a comes into abutment with the free end 43–a within the saddle or clip 56.

In Figures 15–18 there is shown a somewhat modified form of saddle or clip 60 which is made up of outer and inner curved walls 61 and 62 somewhat resembling the walls 57 and 58 of the embodiment of Figure 12, but with a central bridge 63 welded or otherwise secured to the walls 61 and 62 thereby providing a generally H-shaped structure and separating the saddle into left and right slots or compartments into which the ends of the expander strip are fitted so as to maintain them in generally abutting relationship (although, actually, the ends of the expander-spring bear against the opposite sides of the bridge 63 instead of against each other).

In order to prevent "cocking" or tilting of the ends of the expander-spring, it may be desirable to cut the ends off so that free transverse legs 43–a are provided with fragmentary longitudinally-extending legs 41–a and 42–a whose outer ends are generally in axial alignment with the opposite ends of the legs 43–a as indicated particularly in Figure 17 so that the bridge 63 provides generally uniform support at both the upper and lower edges of the expander-spring.

The method of assembly of the expander and saddle of Figures 15–18 is obvious; the two free ends of the expander being slipped end-wise (or axially) into position intermediate the walls 61 and 62 in the manner indicated in Figures 17 and 18.

In Figure 19 there is shown a slightly modified form of saddle 60–a which is generally like the saddle 60 of Figure 16 except that the bridging-portion 63–a is formed as an integral bent portion of the outer wall 61–a which is spot-welded or othewise fastened to the inner wall 62–a in the same manner as the bridge 63 of Figure 16.

It is obvious, of course, that the bridging-portion could be bent from the inner wall 62–a instead of the outer wall 61–a, if desired, in which case the bridging-portion would be spot-welded to the outer wall 61–a.

The assembly of the embodiment of Figure 19 is exactly the same as that described hereinabove in connection with the embodiment of Figures 15–18.

While the bridging-portions 63 and 63–a are shown as having parallel axially-extending sides, it is apparent that they could be constructed with angled sides so as to make continuous contact with the transverse free legs 43–a.

It is possible to provide the connector clips of Figures 12, 16 and 19 with inwardly-protruding buttons like that shown in Figures 3 and 5 for the purpose of providing a more positive interlock between the clip and one end of the expander-spring.

While the various modifications of the novel expander and saddle of the present invention are shown in the drawings as used in conjunction with a one-piece slotted flexible non-resilient sheet-metal oil-control piston-ring, the present invention is not so limited and contemplates the use of this expander and saddle construction with other types of non-resilient piston-rings, both compression rings and oil-control rings, whether of sheet-metal or of cast or other construction and whether one-piece or two or more pieces; including, but not limited to, the various types of piston-rings shown in Patent 2,293,450.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. In a composite oil-control piston-ring including an outer integral trans-split ring of flexible but relatively non-resilient sheet-metal generally U-shaped in cross-section with upper and lower radially-extending walls providing annular axially-spaced cylinder-contacting lands and an intermediate axially-extending wall spaced inwardly from the land edges and having a plurality of circumferentially-spaced oil-drain openings formed therein; and including an inner non-bottoming expander comprising a strip of resilient sheet-metal or the like which is generally axially-corrugated and which has legs extending alternately generally axially and circumferentially; a fastening clip of metal or the like constructed and arranged to hold the free ends of the expander strip in generally abutting relationship thereby to maintain the expander in the form of a closed annulus constructed and arranged to bear against the inner wall of the outer ring and to exert generally uniform circumferentially-distributed outward tension thereon, said clip having an appreciable circumferential dimension and having portions disposed generally on opposite sides of said expander, at least one of said portions extending circumferentially an appreciable distance beyond the free ends of the expander and extending axially for at least the major part of the axial dimension of the expander, said fastening clip also having at least one radial portion extending across said expander and interconnecting the aforesaid portions.

2. In a composite oil-control piston-ring including an outer integral trans-split ring of flexible but relatively non-resilient sheet-metal generally U-shaped in cross-section with upper and lower radially-extending walls providing annular axially-spaced cylinder-contacting lands and an intermediate axially-extending wall spaced inwardly from the land edges and having a plurality of circumferentially-spaced oil-drain openings formed therein; and including an inner non-bottoming expander comprising a strip of resilient sheet-metal or the like which is generally axially-corrugated and which has legs extending alternately generally axially and circumferentially; a fastening clip of metal or the like constructed and arranged to hold the free ends of the expander strip in generally abutting relationship thereby to maintain the expander in the form of a closed annulus constructed and arranged to bear against the inner wall of the outer ring and to exert generally uniform circumferentially-distributed outward tension thereon, said clip comprising a circumferentially-extending member having at least one slot extending circumferentially an appreciable distance beyond at least one free end of the expander and extending axially for at least the major part of the axial dimension of the expander, said fastening clip constructed and arranged to receive one end of the expander in circumferentially-insertable relationship.

3. In a composite oil-control piston-ring including an outer integral trans-split ring of flexible but relatively non-resilient sheet-metal generally U-shaped in cross-section with upper and lower radially-extending walls providing annular axially-spaced cylinder-contacting lands and an intermediate axially-extending wall spaced inwardly from the land edges and having a plurality of circumferentially-spaced oil-drain openings formed therein; and including an inner non-bottoming expander comprising a strip of resilient sheet-metal or the like which is generally axially-corrugated and which has legs extending alternately generally axially and circumferentially; a fastening clip of metal or the like constructed and arranged to hold the free ends of the expander strip in generally abutting relationship thereby to maintain the expander in the form of a closed annulus constructed and arranged to bear against the inner wall of the outer ring and to exert generally uniform circumferentially-distributed outward tension thereon, said clip having a generally C-shaped axial cross-section providing a channel having an axial dimension generally the same as that of the expander into which the ends of the expander can be fitted circumferentially.

4. In a composite oil-control piston-ring including an outer integral trans-split ring of flexible but relatively non-resilient sheet-metal generally U-shaped in cross-section with upper and lower radially-extending walls providing annular axially-spaced cylinder-contacting lands and an intermediate axially-extending wall spaced inwardly from the land edges and having a plurality of circumferentially-spaced oil-drain openings formed therein; and including an inner non-bottoming expander comprising a strip of resilient sheet-metal or the like which is generally axially-corrugated and which has legs extending alternately generally axially and circumferentially; a fastening clip of metal or the like constructed and arranged to hold the free ends of the expander strip in generally abutting relationship thereby to maintain the expander in the form of a closed annulus constructed and arranged to bear against the inner wall of the outer ring and to exert generally uniform circumferentially-distributed outward tension thereon, said clip having a generally C-shaped axial cross-section providing a channel having an axial dimension generally the same as that of the expander into which the ends of the expander can be fitted circumferentially and having a radial indentation locking one of the ends of the expander thereto.

5. In a composite oil-control piston-ring including an outer integral trans-split ring of flexible but relatively non-resilient sheet-metal generally U-shaped in cross-section with upper and lower radially-extending walls providing annular axially-spaced cylinder-contacting lands and an intermediate axially-extending wall spaced inwardly from the land edges and having a plurality of circumferentially-spaced oil-drain openings formed therein; and including an inner non-bottoming expander comprising a strip of resilient sheet-metal or the like which is generally axially-corrugated and which has legs extending alternately generally axially and circumferentially; a fastening clip of metal or the like constructed and arranged to hold the free ends of the expander strip in generally abutting relationship thereby to maintain the expander in the form of a closed annulus constructed and arranged to bear against the inner wall of the outer ring and to exert generally uniform circumferentially-distributed outward tension thereon, said clip having a generally C-shaped radial cross-section with its closed-end adapted to make axial interconnection with one end of said expander and its open-end extending circumferentially an appreciable distance beyond said end of the expander and adapted to receive a substantial portion of the other end of the expander in circumferentially-insertable relationship, and extending axially for at least the major part of the axial dimension of the expander.

6. In a composite oil-control piston-ring including an outer integral trans-split ring of flexible but relatively non-resilient sheet-metal generally U-shaped in cross-section with upper and lower radially-extending walls providing annular axially-spaced cylinder-contacting lands and an intermediate axially-extending wall spaced inwardly from the land edges and having a plurality of circumferentially-spaced oil-drain openings formed therein; and including an inner non-bottoming expander comprising a strip of resilient sheet-metal or the like which is generally axially-corrugated and which has legs extending alternately generally axially and circumferentially; a fastening clip of metal or the like constructed and arranged to hold the free ends of the expander strip in generally abutting relationship thereby to maintain the expander in the form of a closed annulus constructed and arranged to bear against the inner wall of the outer ring and to exert generally uniform circumferentially-distributed outward tension thereon, said slip having a plurality of circumferentially extending legs defining a generally H-shaped radial cross-section adapted to receive the ends of the expander in circumferentially-insertable relationship, said legs extending circumferentially an appreciable distance beyond the free ends of the expander and extending axially for at least the major part of the axial dimension of the expander.

7. For use with a non-resilient piston-ring having a non-bottoming expander-spring comprising a strip of resilient sheet-metal or the like which is generally axially-corrugated and which has legs extending alternately generally axially and circumferentially, a fastening clip of metal or the like constructed and arranged to hold the free ends of the expander strip in generally abutting relationship thereby to maintain the expander in the form of a closed annulus, said clip having an appreciable circumferential dimension and having portions disposed generally on opposite sides of said expander, at least one of said portions extending circumferentially an appreciable distance beyond the free ends of the expander and extending axially for at least the major part of the axial dimension of the expander, said fastening clip also having at least one radial portion extending across said expander and interconnecting the aforesaid portions.

8. For use with a non-resilient piston-ring having a non-bottoming expander-spring comprising a strip of resilient sheet-metal or the like which is generally axially-corrugated and which has legs extending alternately generally axially and circumferentially, a fastening clip of metal or the like constructed and arranged to hold the free ends of the expander strip in generally abutting relationship thereby to maintain the expander in the form of a closed annulus, said clip comprising a circumferentially-extending member having at least one slot extending circumferentially an appreciable distance beyond at least one free end of the expander and extending axially for at least the major part of the axial dimension of the expander, said fastening clip constructed and arranged to receive one end of the expander in circumferentially-insertable relationship.

9. For use with a non-resilient piston-ring having a non-bottoming expander-spring comprising a strip of resilent sheet-metal or the like which is generally axially-corrugated and which has legs extending alternately generally axially and circumferentially, a fastening clip of metal or the like constructed and arranged to hold the free ends of the expander strip in generally abutting relationship thereby to maintain the expander in the form of a closed annulus, said clip having a generally C-shaped axial cross-section providing a channel having an axial dimension generally the same as that of the expander into which the ends of the expander can be fitted circumferentially.

10. For use with a non-resilient piston-ring having a non-bottoming expander-spring comprising a strip of resilient sheet-metal or the like which is generally axially-corrugated and which has legs extending alternately generally axially and circumferentially, a fastening clip of metal or the like constructed and arranged to hold the free ends of the expander strip in generally abutting relationship thereby to maintain the expander in the form of a closed annulus, said clip having a generally C-shaped axial cross-section providing a channel having an axial dimension generally the same as that of the expander into which the ends of the expander can be fitted circumferentially and having a radial indentation locking one of the ends of the expander thereto.

11. For use with a non-resilient piston-ring having a non-bottoming expander-spring comprising a strip of resilient sheet-metal or the like which is generally axially-corrugated and which has legs extending alternately generally axially and circumferentially, a fastening clip of metal or the like constructed and arranged to hold the free ends of the expander strip in generally abutting relationship thereby to maintain the expander in the form of a closed annulus, said clip having a generally C-shaped radial cross-section with its closed-end adapted to make axial interconnection with one end of said expander and its open-end extending circumferentially an appreciable distance beyond said end of the expander and adapted to receive a substantial portion of the other end of the expander in circumferentially-insertable relationship, and extending axially for at least the major part of the axial dimension of the expander.

12. For use with a non-resilient piston-ring having a non-bottoming expander-spring comprising a strip of resilient sheet-metal or the like which is generally axially-corrugated and which has legs extending alternately generally axially and circumferentially, a fastening clip of metal or the like constructed and arranged to hold the free ends of the expander strip in generally abutting relationship thereby to maintain the expander in the form of a closed annulus, said clip having a plurality of circumferentially extending legs defining a generally H-shaped radial cross-section adapted to receive the ends of the expander in circumferentially-insertable relationship, said legs extending circumferentially an appreciable distance beyond the free ends of the expander and extending axially for at least the major part of the axial dimension of the expander.

13. In a composite oil-control piston-ring including an outer cylinder-contacting ring and an inner non-bottoming generally axially-corrugated expander having legs extending alternately generally axially and circumferentially; a fastening clip constructed and arranged to hold the free ends of the expander in generally abutting relationship to maintain the expander in the form of a closed annulus constructed and arranged to bear against the outer ring and to exert generally uniform circumferentially-distributed outward tension thereon, said fastening clip extending circumferentially beyond the ends of said expander across a plurality of the generally axially-extending legs thereof and having portions disposed on opposite sides of said expander, at least one of said portions extending for at least the major part of the axial dimension of the expander, said fastening clip having at least one radial portion extending across said expander and interconnecting the aforesaid portions.

14. For use with a non-resilient piston-ring having a non-bottoming expander-spring comprising a strip of resilient sheet-metal which is generally axially-corrugated and which has legs extending alternately generally axially and circumferentially, a fastening clip constructed and arranged to hold the free ends of the expander in generally abutting relationship to maintain the expander in the form of a closed annulus constructed and arranged to bear against the outer ring and to exert generally uniform circumferentially-distributed outward tension thereon, said fastening clip extending circumferentially beyond the ends of said expander across a plurality of the generally axially-extending legs thereof and having portions disposed on opposite sides of said expander, at least one of said portions extending for at least the major part of the axial dimension of the expander, said fastening clip having at least one radial portion extending across said expander and interconnecting the aforesaid portions.

15. In a composite oil-control piston-ring including an outer cylinder-contacting ring and an inner non-bottoming generally axially-corrugated expander having legs extending alternately generally axially and circumferentially; a fastening clip constructed and arranged to hold the free ends of the expander in generally abutting relationship to maintain the expander in the form of a closed annulus constructed and arranged to bear against the outer ring and to exert generally uniform circumferentially-distributed outward tension thereon, said fastening clip having a portion extending axially for at least the major part of the axial dimension of the expander and extending circumferentially across a plurality of generally axially-extending expander-legs an appreciable distance beyond the free ends of the expander and having a plurality of radially-extending buttons adapted to pass through said expander, each of said buttons adapted to pass between a pair of generally axially-extending expander-legs and adapted to secure the ends of said expander in abutting relationship circumferentially between said buttons.

16. For use with a non-resilient piston-ring having a non-bottoming expander-spring comprising a strip of resilient sheet-metal which is generally axially-corrugated and which has legs extending alternately generally axially and circumferentially, a fastening clip constructed and arranged to hold the free ends of the expander in generally abutting relationship to maintain the expander in the form of a closed annulus constructed and arranged to bear against the outer ring and to exert generally uniform circumferentially-distributed outward tension thereon, said fastening clip having a portion extending axially for at least the major part of the axial dimension of the expander and extending circumferentially across a plurality of generally axially-extending expander-legs an appreciable distance beyond the free ends of the expander and having a plurality of radially-extending buttons adapted to pass through said expander, each of said buttons adapted to pass between a pair of generally axially-extending expander-legs and adopted to secure the ends of said expander in abutting relationship circumferentially between said buttons.

17. In a composite oil-control piston-ring including an outer cylinder-contacting ring and an inner non-bottoming generally axially-corrugated expander having legs extending alternately generally axially and circumferentially; a fastening clip constructed and arranged to hold the free ends of the expander in generally abutting relationship to maintain the expander in the form of a closed annulus constructed and arranged to bear against the outer ring and to exert generally uniform circumferentially-distributed outward tension thereon, said fastening clip having a portion extending axially for at least the major part of the axial dimension of the expander and extending circumferentially across a plurality of generally axially-extending expander-legs an appreciable distance beyond the free ends of the expander and having a generally elongated C-shaped radial cross-section with one end adapted to span said expander radially and to make axial interconnection with one end of said expander, and its other end adapted to receive the other end of the expander to hold the ends of the expander in circumferentially abutting relationship.

18. In a composite oil-control piston-ring including an outer cylinder-contacting ring and an inner non-bottoming generally axially-corrugated expander having legs extending alternately generally axially and circumferentially; a fastening clip constructed and arranged to hold the free ends of the expander in generally abutting relationship to maintain the expander in the form of a closed annulus constructed and arranged to bear against the outer ring and to exert generally uniform circumferentially-distributed outward tension thereon, said fastening clip having a portion extending axially for at least the major part of the axial dimension of the expander and extending circumferentially across a plurality of generally axially-extending expander-legs an appreciable distance beyond the free ends of the expander and having a generally elongated C-shaped radial cross-section with one end adapted to span said expander radially and to make axial interconnection with one end of said expander, and its other end adapted to receive the other end of the expander in axially-insertable relationship to hold the ends of the expander in circumferentially abutting relationship.

FREDERICK W. WILKENING.
HELMUTH G. BRAENDEL.
CARL F. ENGELHARDT.

References Cited in the file of this patent

UNITED STATES PATENTS

| Number | Name | Date |
| --- | --- | --- |
| 1,377,151 | Baker | May 3, 1921 |
| 1,767,711 | Solenberger | June 24, 1930 |
| 2,281,873 | Engelhardt | May 5, 1942 |
| 2,293,450 | Wilkening | Aug. 18, 1942 |
| 2,343,942 | Teetor | Mar. 14, 1944 |
| 2,439,702 | Teetor | Apr. 13, 1948 |
| 2,452,503 | Teetor | Oct. 26, 1948 |

FOREIGN PATENTS

| Number | Country | Date |
| --- | --- | --- |
| 538,681 | Great Britain | Aug. 31, 1941 |